United States Patent
Lee et al.

(10) Patent No.: US 12,360,207 B2
(45) Date of Patent: Jul. 15, 2025

(54) METHOD AND APPARATUS FOR PROCESSING SENSOR INFORMATION AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Woo Young Lee, Seoul (KR); Dong Geol Yang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 277 days.

(21) Appl. No.: 17/821,824

(22) Filed: Aug. 24, 2022

(65) Prior Publication Data

US 2023/0060526 A1    Mar. 2, 2023

(30) Foreign Application Priority Data

Aug. 31, 2021 (KR) .................. 10-2021-0115670

(51) Int. Cl.
*G01S 7/40* (2006.01)
*G01S 13/89* (2006.01)
*G01S 13/931* (2020.01)

(52) U.S. Cl.
CPC .............. *G01S 7/40* (2013.01); *G01S 13/89* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 10,609,148 B1* | 3/2020 | Tran | G06Q 50/40 |
| 2017/0242117 A1 | 8/2017 | Izzat et al. | |
| 2018/0120133 A1* | 5/2018 | Blank | G01D 18/002 |
| 2020/0111011 A1* | 4/2020 | Viswanathan | G06N 20/10 |
| 2020/0174112 A1* | 6/2020 | Xing | G01S 7/41 |
| 2020/0377108 A1* | 12/2020 | Balazs | G06V 10/803 |
| 2021/0146951 A1 | 5/2021 | Kabai | |
| 2021/0174528 A1* | 6/2021 | Mordechai | G01S 17/89 |

FOREIGN PATENT DOCUMENTS

| | | | | |
|---|---|---|---|---|
| CN | 111366901 A | * | 7/2020 | G01S 13/886 |
| JP | 2006146372 A | | 6/2006 | |
| KR | 1020200144862 | | 12/2020 | |
| KR | 1020210001873 | | 1/2021 | |

OTHER PUBLICATIONS

"Standard representation of geographic point location by coordinates"; ISO/FDIS 6709; no author given; published by the International Organization for Standardization (ISO); Geneva, Switzerland; copyright in the year 2008. (Year: 2008).*

* cited by examiner

*Primary Examiner* — Bernarr E Gregory
(74) *Attorney, Agent, or Firm* — Fox Rothschild LLP

(57) ABSTRACT

A method of processing sensor information of the present disclosure includes generating, based on location information of a target object and low-level sensor information detected from the target object at the corresponding location, a ground truth for each of sensor beam sections detecting the target object, and generating, based on the ground truth, a sensor performance map containing information on accuracy of low-level sensor information detected in the corresponding sensor beam section.

18 Claims, 15 Drawing Sheets

US 12,360,207 B2

METHOD AND APPARATUS FOR PROCESSING SENSOR INFORMATION AND RECORDING MEDIUM STORING PROGRAM TO EXECUTE THE METHOD

PRIORITY

The present application claims under 35 U.S.C. § 119(a) the benefit of Republic of Korea Patent Application No. 10-2021-0115670, filed on Aug. 31, 2021, which is hereby incorporated by reference as if fully set forth herein.

BACKGROUND OF THE DISCLOSURE

Field of the Disclosure

Embodiments relate to a method and apparatus for processing sensor information and a recording medium storing a program to execute the method, and more particularly to a method and apparatus for processing sensor information with improved accuracy and a recording medium storing a program to execute the method.

Discussion of the Related Art

Sensor fusion technology may be used for accurate positioning of a vehicle, precise positioning technology, digital map technology, an advanced driver assistance system (ADAS) for checking the driving state of a driver, and the like.

Sensor fusion technology may be technology for highly reliably recognizing a situation around a host vehicle through fusion of information sensed by a plurality of sensors mounted in the vehicle, such as a front radio detection and ranging (RaDAR), a front camera, and a side RaDAR.

With an increase in the level of driving automation, highly reliable and accurate sensor information has come to be required, and research for increasing the reliability and accuracy of sensor information processing technology has been conducted.

SUMMARY OF THE DISCLOSURE

Accordingly, embodiments may be directed to a method and apparatus for processing sensor information and a recording medium storing a program to execute the method that substantially obviate one or more problems due to limitations and disadvantages of the related art.

Embodiments provide a method and apparatus for processing sensor information with improved accuracy and reliability and a recording medium storing a program to execute the method.

However, the objects to be accomplished by the embodiments may not be limited to the above-mentioned objects, and other objects not mentioned herein will be clearly understood by those skilled in the art from the following description.

A method of processing sensor information according to an embodiment may include generating, based on location information of a target object and low-level sensor information detected from the target object at the corresponding location, a ground truth for each of sensor beam sections detecting the target object, and generating, based on the ground truth, a sensor performance map containing information on accuracy of low-level sensor information detected in the corresponding sensor beam section.

For example, the generating a ground truth may include estimating, based on the location information, four vertices of a box corresponding to the contour of the target object, selecting a sensor beam capable of measuring regions between the four vertices, and generating an intersection point between any one of four sides of the box and the sensor beam as a ground truth of the corresponding beam section.

For example, the generating the intersection point as a ground truth of the corresponding beam section may include calculating, with the start point of the sensor beam set as an origin point, a first equation of a straight line interconnecting two vertices of a side of the box having the intersection point thereon, calculating, with an intersection point between the center line of the sensor beam and the side of the box set as a representative point of the corresponding beam section, a second equation of a straight line interconnecting the representative point and the origin point, and calculating an intersection point between a line defined by the first equation of a straight line and a line defined by the second equation of a straight line as the ground truth.

For example, the generating a sensor performance map may include selecting low-level sensor information present within a predetermined distance from a ground truth of the corresponding section, among the sensor beam sections, as target low-level information, calculating error components including a location error and a speed error between the target low-level information and the ground truth, and storing the error components for each of the sensor beam sections to generate the sensor performance map.

For example, the generating a sensor performance map may further include displaying the target low-level information on a polar grid cell, and the calculating error components may include calculating at least one of a mean of errors or a variance of errors of the target low-level information displayed on the polar grid cell.

For example, the generating a sensor performance map may include transforming the coordinate system of the target low-level information from the polar coordinate system to a normal coordinate system, estimating, based on the normal coordinate system, a field of view (FOV) in which the target low-level information may be acquired, and storing the estimated FOV to generate the sensor performance map.

For example, the generating a sensor performance map may include generating the sensor performance map taking into account at least one of the weather condition, including snow, rain, fog, and temperature, or the type of road, including an expressway, a city road, and an unpaved road.

For example, the method may further include sensing a target object moving within a section estimated to be the FOV of a sensor using a plurality of sensors, and acquiring location information of the target object and low-level sensor information detected from the target object at the corresponding location.

For example, the method may further include acquiring low-level sensor information detected from a target object located near a vehicle through a plurality of sensors after the generating a sensor performance map, and processing sensor information by processing the low-level sensor information based on the sensor performance map.

For example, the processing sensor information may include removing erroneously detected information from the low-level sensor information based on the FOV stored in the sensor performance map.

For example, the processing sensor information may include determining whether detected objects may be the same object based on the low-level sensor information according to reliability of each of the sensor beam sections set in the sensor performance map.

For example, the processing sensor information may include variably assigning different weights for fusion to the plurality of sensors according to reliability of each of the plurality of sensors set in the sensor performance map to fuse the sensor information.

For example, the fusing sensor information may include selecting and applying a sensor performance map corresponding to at least one of the weather condition, including snow, rain, fog, and temperature, or the type of road, including an expressway, a city road, and an unpaved road.

According to another embodiment, a recording medium in which a program for executing a method of processing sensor information may be recorded may store a program to implement a function of generating, based on location information of a target object and low-level sensor information detected from the target object at the corresponding location, a ground truth for each of sensor beam sections detecting the target object, and a function of generating, based on the ground truth, a sensor performance map containing information on accuracy of low-level sensor information detected in the corresponding sensor beam section. The recording medium may be read by a computer system.

An apparatus for processing sensor information according to still another embodiment may include a first controller configured to generate, based on location information of a target object and low-level sensor information detected from the target object at the corresponding location, a ground truth for each of sensor beam sections detecting the target object and to generate, based on the ground truth, a sensor performance map containing information on accuracy of low-level sensor information detected in the corresponding sensor beam section, a second controller configured to acquire low-level sensor information detected from a target object located near a vehicle through a plurality of sensors after the sensor performance map may be built and to fuse sensor information by processing the low-level sensor information based on the sensor performance map, and a memory configured to store the sensor performance map.

For example, the first controller may estimate, based on the location information, four vertices of a box corresponding to the contour of the target object, may select a sensor beam capable of measuring regions between the four vertices, and may generate an intersection point between any one of four sides of the box and the sensor beam as a ground truth of the corresponding beam section.

For example, the first controller may generate the sensor performance map by selecting low-level sensor information present within a predetermined distance from a ground truth of the corresponding section, among the sensor beam sections, as target low-level information, calculating error components including a location error and a speed error between the target low-level information and the ground truth, and storing the error components for each of the sensor beam sections, may estimate a field of view (FOV) in which the target low-level information may be acquired, and may store the estimated FOV in the sensor performance map.

For example, the first controller may generate the sensor performance map taking into account at least one of the weather condition, including snow, rain, fog, and temperature, or the type of road, including an expressway, a city road, and an unpaved road.

For example, the second controller may fuse the sensor information by removing erroneously detected information from the low-level sensor information based on the FOV stored in the sensor performance map, determining whether detected objects may be the same object based on the low-level sensor information according to accuracy of the low-level sensor information detected in the sensor beam sections, and variably assigning different weights for fusion to the plurality of sensors according to reliability of each of the plurality of sensors set in the sensor performance map.

BRIEF DESCRIPTION OF THE DRAWINGS

The accompanying drawings, which may be included to provide a further understanding of the disclosure and may be incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
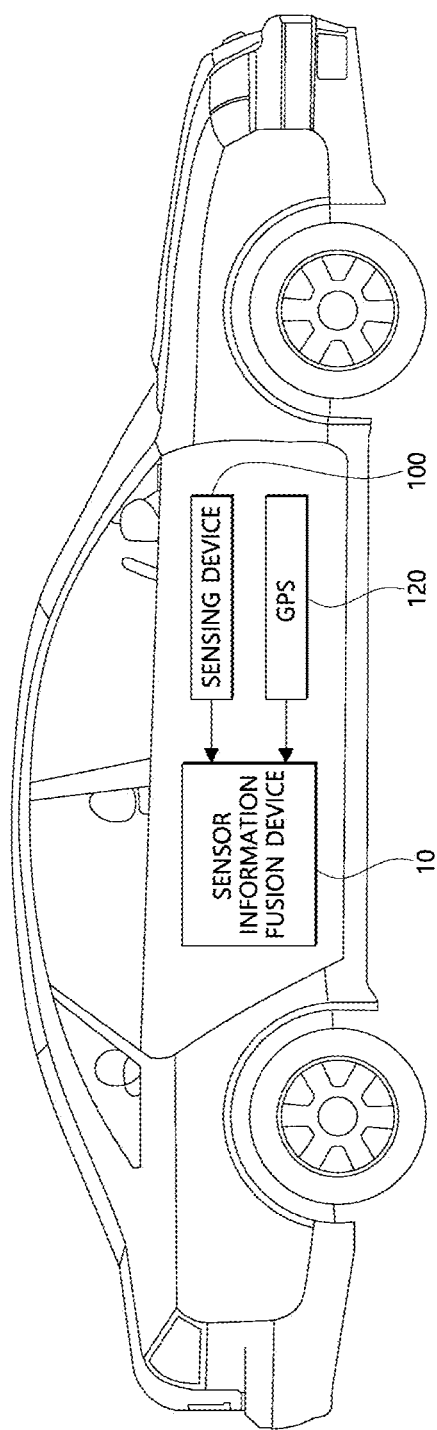
FIG. 1 is a diagram for explaining a vehicle to which a sensor information processing apparatus according to an embodiment may be applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

The present disclosure will now be described more fully hereinafter with reference to the accompanying drawings, in which various embodiments may be shown. The examples, however, may be embodied in many different forms, and should not be construed as being limited to the embodiments set forth herein. Rather, these embodiments may be provided so that this disclosure will be more thorough and complete, and will more fully convey the scope of the disclosure to those skilled in the art.

It will be understood that when an element may be referred to as being "on" or "under" another element, it may be directly on/under the element, or one or more intervening elements may also be present.

When an element may be referred to as being "on" or "under", "under the element" as well as "on the element" may be included based on the element.

In addition, relational terms, such as "first", "second", "on/upper part/above" and "under/lower part/below", may be used only to distinguish between one subject or element and another subject or element, without necessarily requiring or involving any physical or logical relationship or sequence between the subjects or elements.

According to a conventional sensor information processing method, in a process of associating various types of sensors, associated sensors may be selected based on the minimum distance from a reference sensor, and associated sensors may be finally selected through an additional process of determining ID retention. In contrast, according to a sensor information processing method of this embodiment, a plurality of pieces of track information sensed through a plurality of sensors may be fused to calculate an association value (AssocCost), which includes a sensor output distance and ID retention, thereby obtaining an association result of optimally disposed sensors of various types.

Hereinafter, a method and apparatus for processing sensor information and a recording medium storing a program to execute the method according to embodiments will be described with reference to the accompanying drawings.

FIG. 1 is a diagram for explaining a vehicle to which a sensor information processing apparatus according to an embodiment may be applied.

As shown in FIG. 1, a sensor information processing apparatus may include a sensing device 100 for sensing an object present outside a vehicle, a GPS 120 for acquiring GPS information, and a sensor information fusion device 10 for recognizing an object based on sensor information acquired by the sensing device 100 and GPS information acquired by the GPS 120.

The sensing device 100 may include one or more sensors for detecting an object located near the vehicle, for example, a preceding vehicle, and measuring a distance to the object, a relative speed of the object, and the like. For example, the sensing device 100 may include various sensors such as a radio detection and ranging (RaDAR), a camera, and a light detection and ranging (LiDAR). The sensing device 100 acquires sensing information from an object present within a measurement range. The measurement range of the sensing device 100 may be expressed as a field of view (FOV) indicating a measurement angle. The sensing device 100 detects an object present within the FOV and outputs low-level information having the form of detection points to the sensor information fusion device 10.

The sensor information fusion device 10 may process a point cloud, which may be composed of a plurality of points acquired by the sensing device 100, to recognize an object. The sensor information fusion device 10 of the embodiment generates a sensor performance map, which stores information about the reliability of low-level information for each beam section of the sensor and an estimated value of the FOV, and generates sensor fusion information by fusing sensor information with reference to the sensor performance map, thereby improving the reliability of the low-level information and consequently improving sensor fusion performance.

Figure 2:
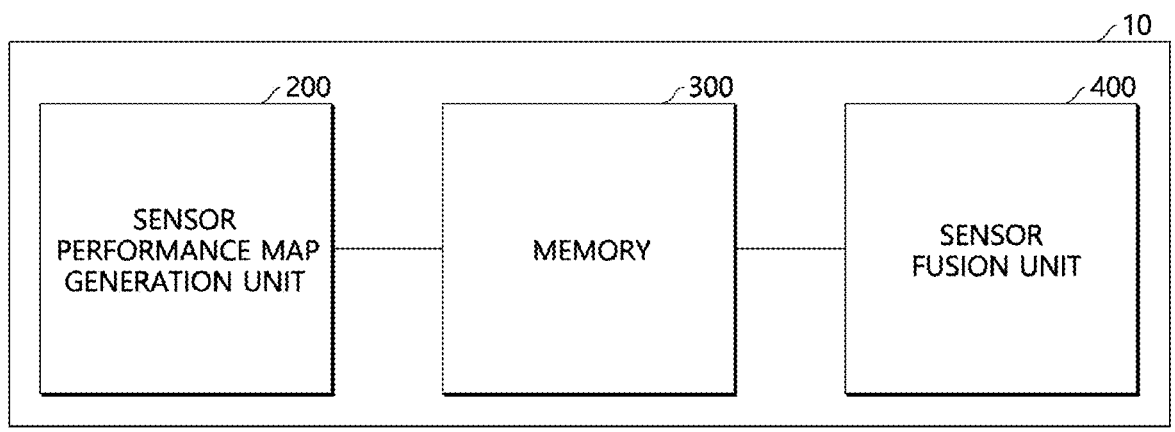
FIG. 2 is a block diagram schematically illustrating the configuration of a sensor information fusion device according to an embodiment.

FIG. 2 is a block diagram schematically illustrating the configuration of the sensor information fusion device 10 according to an embodiment.

Referring to FIG. 2, the sensor information fusion device 10 may include a sensor performance map generation unit 200, a memory 300, and a sensor fusion unit 400.

The sensor performance map generation unit 200 may generate a ground truth within the measurement range of the sensing device 100, and may generate a sensor performance map that stores information about the accuracy and reliability of low-level sensor information for each measurement region. The sensor performance map generation unit 200 may generate a sensor performance map for each of sensors included in the sensing device 100, and may generate a sensor performance map for each of various driving conditions, such as weather and road conditions. The sensor performance map generation unit 200 generates sensor performance maps for a plurality of sensors of the sensing device 100, and stores the same in the memory 300.

The sensor fusion unit 400 may process low-level information, having the form of detection points acquired by the sensing device 100, based on the sensor performance map. The sensor fusion unit 400 may select a sensor performance map that matches a driving condition, may remove erroneously detected points from the detection points, and may perform an association function for determining whether detected objects may be the same object. The sensor fusion unit 400 fuses sensor information based on the reliability information stored in the sensor performance map when performing the association function and sensor fusion, thereby improving the reliability of the result of sensor fusion.

The configuration of the sensor performance map generation unit 200 applied to the sensor information fusion device 10 of the embodiment will be described in detail with reference to FIGS. 3 to 11.

Figure 3:
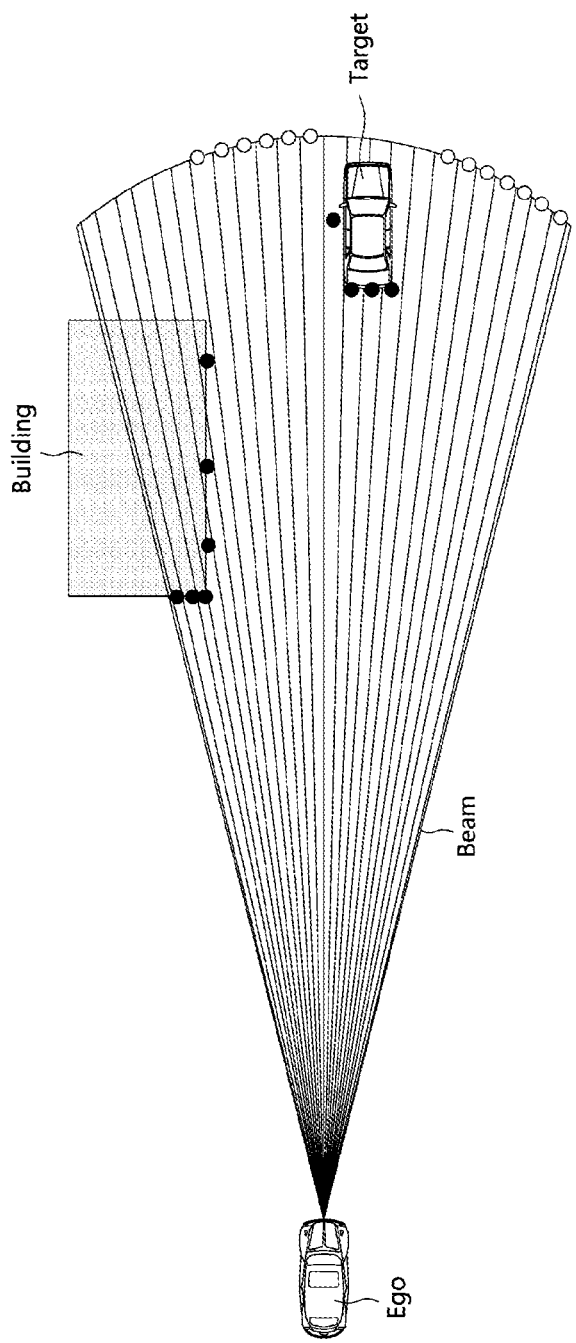
FIG. 3 is a diagram for explaining low-level sensor information detected in each beam section.

FIG. 3 is a diagram for explaining low-level sensor information detected in each beam section.

Referring to FIG. 3, each of the sensors provided in the vehicle, such as a camera and a LiDAR, may sense one point in each beam section within the FOV range thereof. Here, the acquired point may have information, such as a location, a speed, and a distance, and this point information may be referred to as low-level sensor information.

As shown in FIG. 3, when a host vehicle Ego senses an object present ahead thereof, points corresponding to the contour of the object may be acquired in a manner such that each of the points may be sensed in a respective one of the beam sections. When a building may be located ahead, points corresponding to a portion of the contour of the building, which may be located within the FOV, may be acquired in a manner such that each of the points may be sensed in a respective one of the beam sections. In addition, when another vehicle Target may be located ahead, points corresponding to a portion of the contour of the other vehicle Target, which may be located within the FOV, may be acquired in a manner such that each of the points may be sensed in a respective one of the beam sections.

As described above, since low-level information may be output from each beam section, the accuracy and reliability of the low-level information may be evaluated for each beam section. In addition, the performance of the sensor may vary depending on the driving environment, for example, weather conditions, such as snow, rain, fog, and temperature, and the type of road, such as an expressway, a city road, and an unpaved road. Accordingly, the accuracy and reliability of each sensor may be evaluated in each driving environment.

Accordingly, in the embodiment, the sensor performance map, which contains information about the accuracy and reliability of the low-level information evaluated for each beam section according to the driving environment, may be stored, and the previously stored sensor performance map may be applied when the low-level sensor information may be processed.

Figure 4:
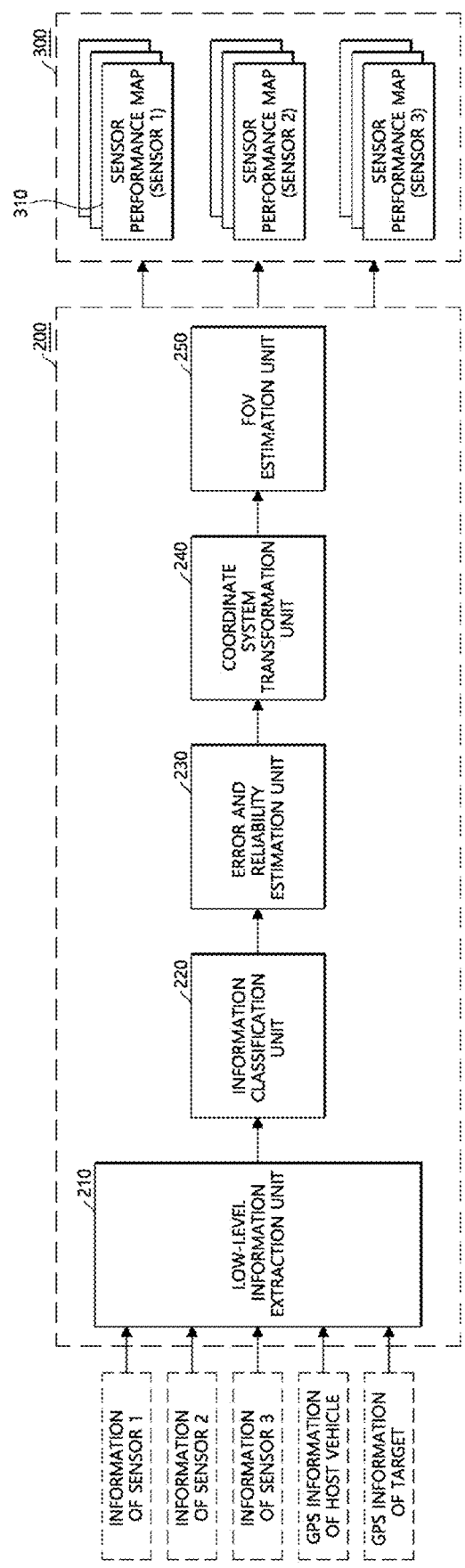
FIG. 4 is a block diagram illustrating the configuration of the sensor performance map generation unit shown in FIG. 2.

FIG. 4 is a block diagram illustrating the configuration of the sensor performance map generation unit 200 and the memory 300 shown in FIG. 2.

Referring to FIG. 4, the sensor performance map generation unit 200 includes a low-level information extraction unit 210, an information classification unit 220, an error and reliability estimation unit 230, a coordinate system transformation unit 240, and an FOV estimation unit 250.

The low-level information extraction unit 210 generates a ground truth for each beam using GPS information of the host vehicle, GPS information of the target vehicle, and low-level information input from the sensors, and extracts low-level information based on the ground truth. The GPS information may provide information such as the position and speed of a point regardless of the size of an object, and an object may be detected in a plurality of beam sections of a sensor depending on the size thereof. Accordingly, in order to accurately evaluate low-level information, a ground truth for each beam may be generated based on the GPS. The low-level information extraction unit 210 selects, from among low-level information for respective sections present near the generated ground truth, the low-level information closest to the ground truth as a target, and outputs the same to the information classification unit 220. When the low-level information may be extracted in this way, the maximum position error between the ground truth and the low-level information may be the same as the distance between the beam sections.

The information classification unit 220 classifies the low-level information extracted as a target based on a polar grid cell. Since section information may be distinguished by a direction θ, the low-level information may be expressed using a polar coordinate system, which indicates a distance and a direction. Due to the use of the polar coordinate system, information may be classified regardless of the size of the beam section of each sensor. The size of the polar grid cell may be set differently depending on the resolution of the sensor section.

The error and reliability estimation unit 230 calculates the means and variances of errors of the locations and the speeds based on the accumulated pieces of low-level information.

The coordinate system transformation unit 240 transforms the polar coordinate system into a normal coordinate system of the International Organization for Standardization (an ISO coordinate system). Because the size of the polar grid cell varies depending on the resolution of a sensor, the polar coordinate system may be transformed into an ISO coordinate system in order to analyze the performance of each sensor. The error and reliability of a grid cell may be estimated by accumulating a plurality of pieces of polar grid cell information based on an ISO grid cell having a given size.

The FOV estimation unit 250 estimates the actual FOV of the sensor based on the extracted information.

The actual FOV and the error and reliability of the grid cell, which may be generated by the sensor performance map generation unit 200 through the above-described process, may be stored in the memory 300 in the form of a sensor performance map for each sensor. The method of generating the sensor performance map by the sensor performance map generation unit 200 will be described in detail with reference to FIGS. 5 to 11.

Figure 5:
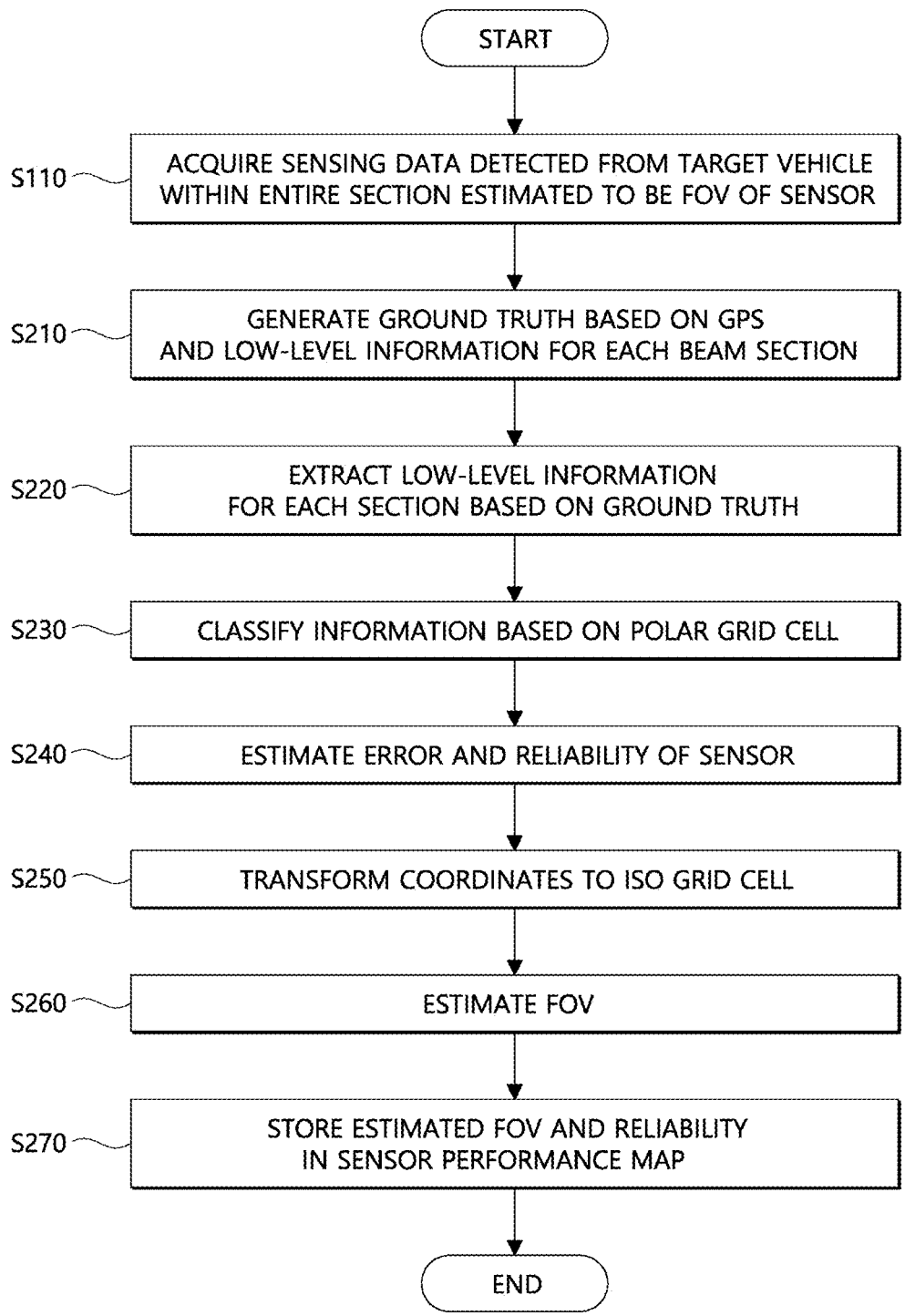
FIG. 5 is a flowchart of a method of generating a sensor performance map according to an embodiment.

FIG. 5 is a flowchart of a method of generating the sensor performance map according to an embodiment, and FIGS. 6 to 12 are diagrams for explaining the method of generating the sensor performance map according to the embodiment.

Figure 6:
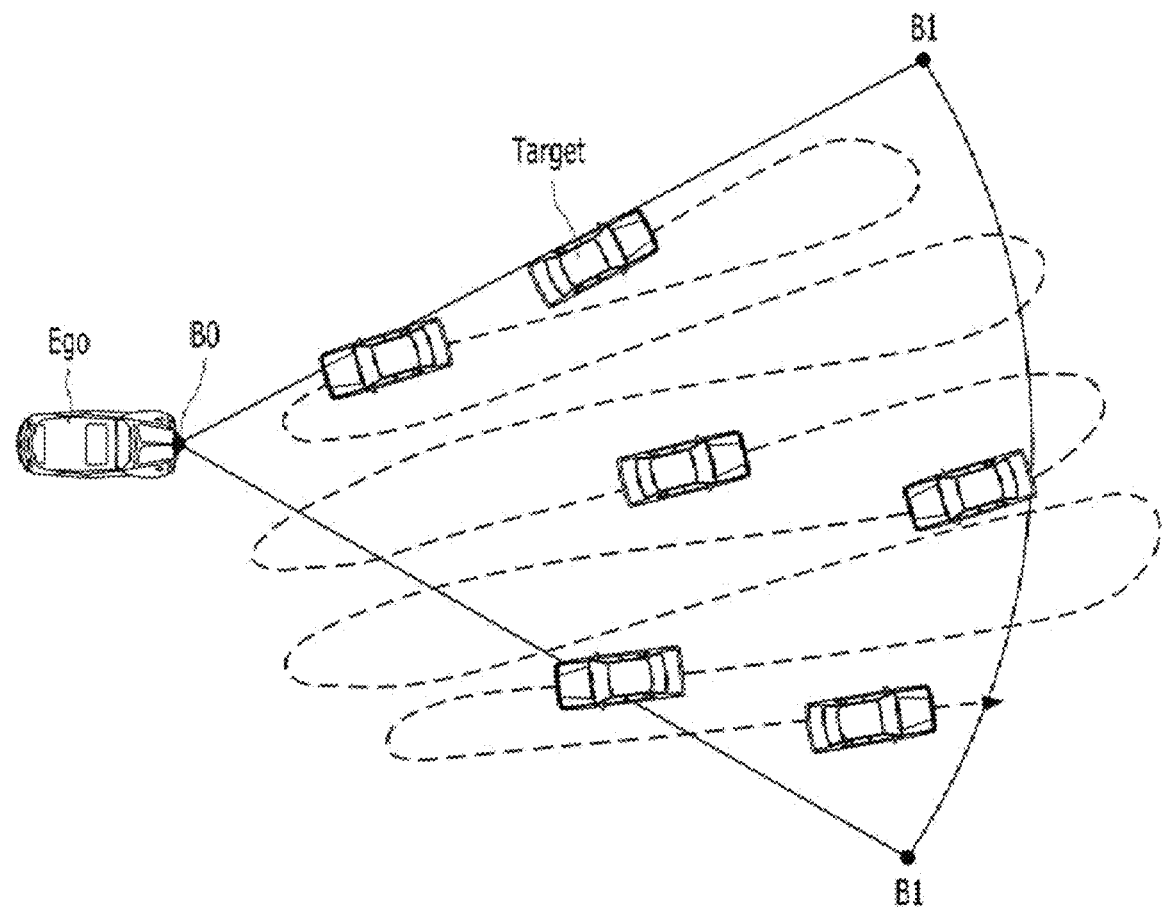
FIGS. 6 to 12 are diagrams for explaining the method of generating a sensor performance map according to the embodiment.

Referring to FIG. 5, sensing data may be acquired by sensing a target vehicle within the entire section estimated to be the FOV of the sensor in order to generate the sensor performance map (S110). To this end, as shown in FIG. 6, when the target vehicle Target moves within the section estimated to be the FOV of the sensor of the host vehicle Ego, the host vehicle Ego acquires data on the moving target vehicle Target in a stopped state. The sensor data acquired from the target vehicle may include GPS information of the target vehicle Target and low-level information detected based on the contour of the target vehicle Target at the corresponding location. For accurate FOV estimation, the target vehicle Target may be moved so that the same passes through the boundary regions of the FOV of the sensor, i.e. the section from B0 to B1 and the section from B0 to B2. In addition, the FOV of the sensor may be divided into beam sections in units of θ, and the target vehicle Target may move at a sufficiently low speed, e.g. 10 km/h, in order to acquire data from all of the beam sections.

Figure 7:
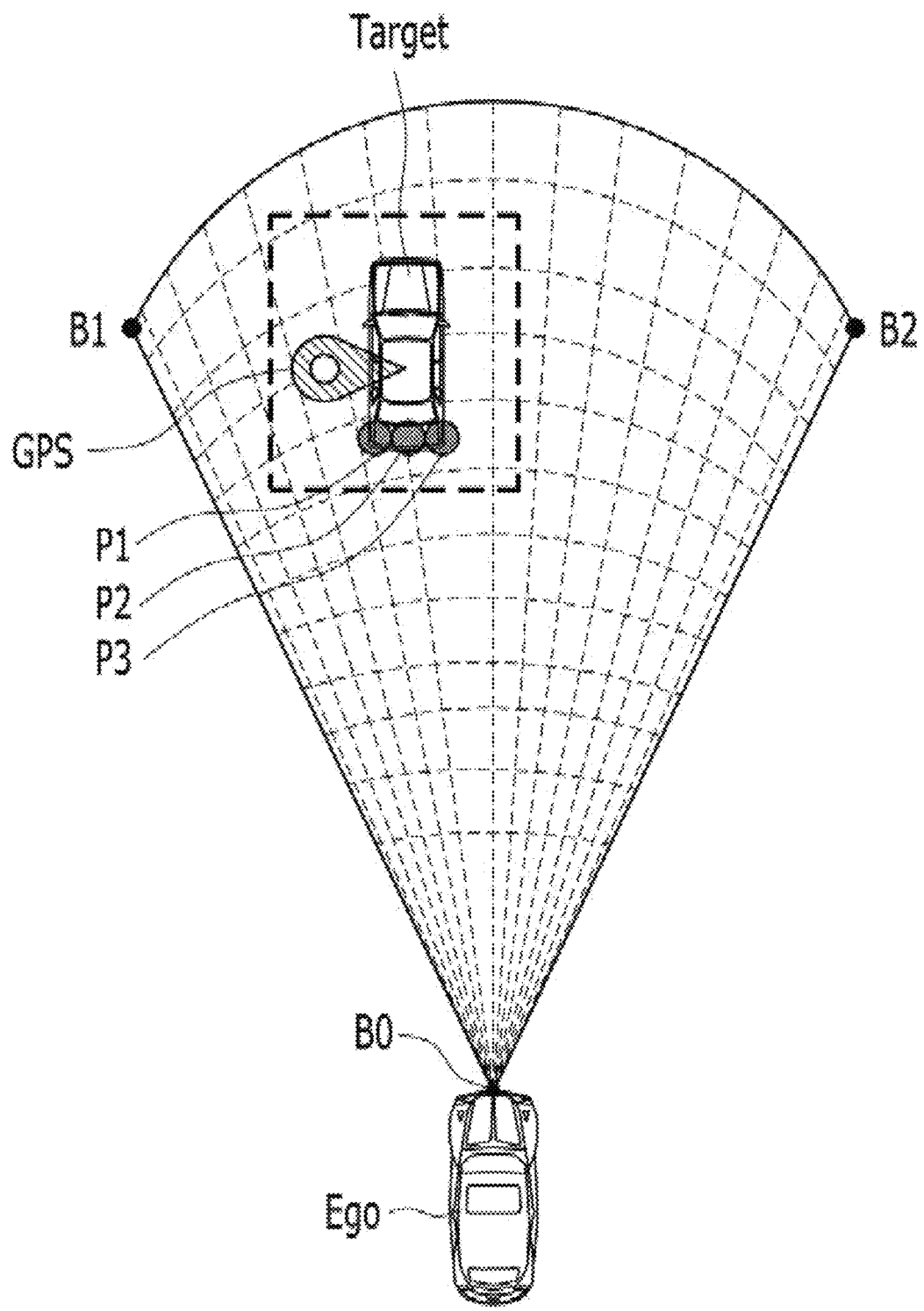

After the sensor data may be acquired from the target vehicle, the low-level information extraction unit 210 generates a ground truth based on the beam sections of the sensor (S210). The sensor data acquired from the target vehicle may include GPS information of the target vehicle Target and low-level information detected based on the contour of the target vehicle Target at the corresponding location. Referring to FIG. 7, when the target vehicle Target moves within the section estimated to be the FOV of the sensor of the host vehicle Ego (the fan-shaped section B1B0B2), GPS information of the target vehicle Target at a specific location and points P1, P2, and P3 detected based on the contour of the target vehicle Target at the corresponding location may be acquired. The GPS information provides information such as the location and the speed of one point regardless of the size of an object. Because an object may be detected by the beams of the sensor depending on the size of the object, a plurality of pieces of point information may be detected. Therefore, it may be necessary to estimate a ground truth for each beam based on GPS information in order to accurately evaluate low-level sensor information.

Figure 8B:
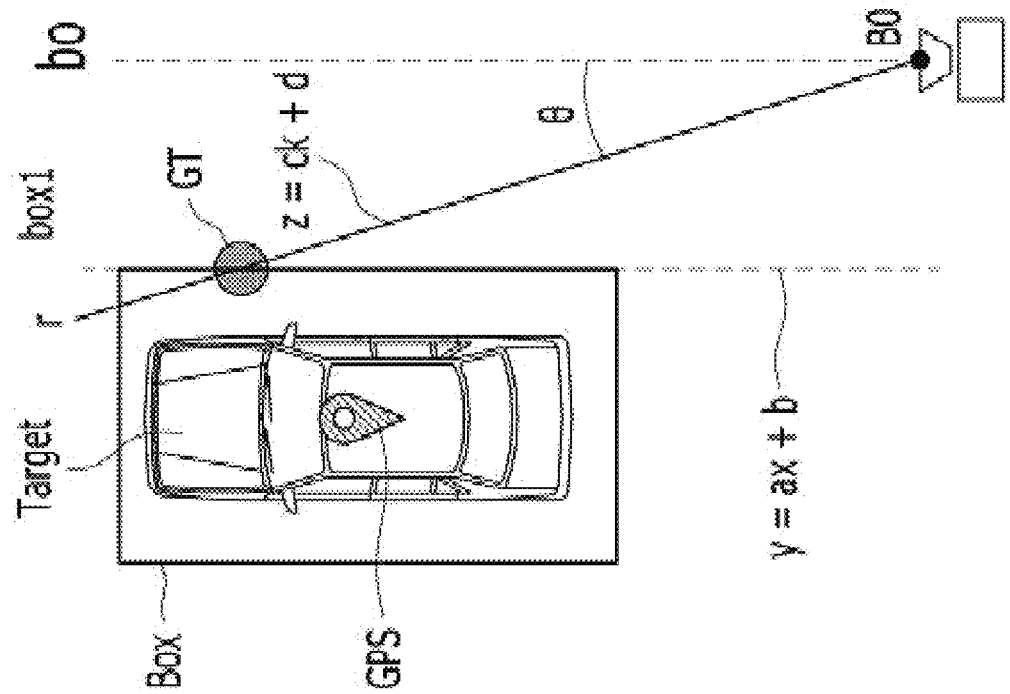
Figure 8A:
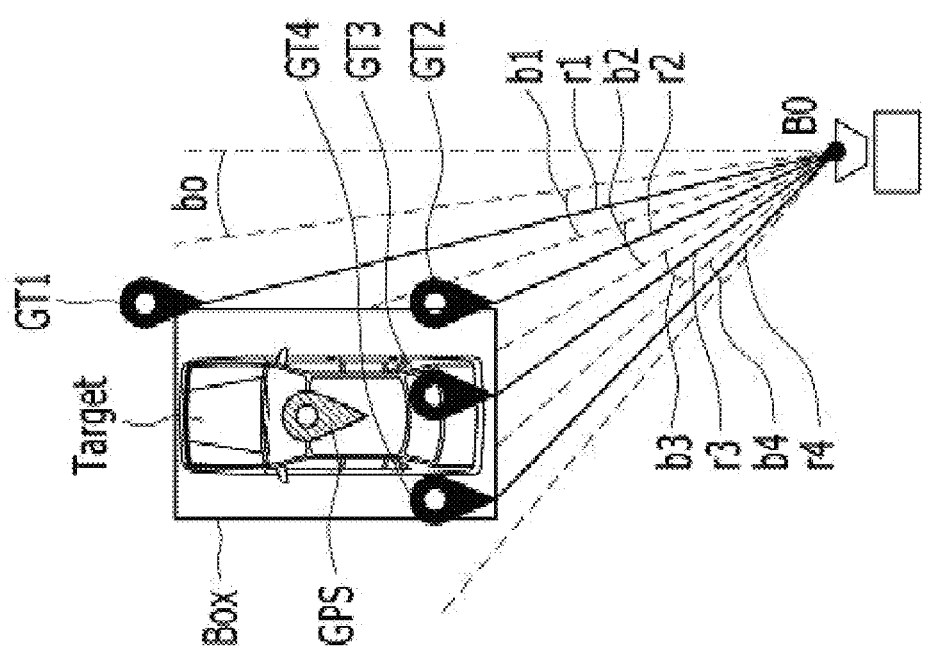

FIGS. 8A and 8B are diagrams for explaining a method of estimating a ground truth.

Referring to FIG. 8A, four vertices of a box of the target vehicle Target may be estimated using GPS information of the target vehicle Target. Thereafter, sensor beams for measuring the regions between the four vertices of the box may be selected. Beams b1 to b4 may be selected as beams overlapping the box. The center lines of the beam sections may be set to representative section lines r1, r2, r3, and r4, and points located in the representative section lines r1, r2, r3, and r4 may be used as representative points.

Referring to FIG. 8B, an intersection point between a line defined by the equation of a straight line interconnecting the sensor and the representative point of each section, i.e. the equation of each of the representative section lines r1, r2, r3, and r4, and a line defined by the equation of a straight line extending from a side of the box of the object may be generated as a ground truth. In FIG. 8B, the equation of the representative section line r may be the equation of a straight line interconnecting the origin (0,0), which corresponds to the position B0 of the sensor, and a point located at the maximum detection distance from the sensor. The equation of a straight line extending from a side of the box of the object may be the equation of a straight line interconnecting two vertices of the corresponding box.

This may be expressed using the following formulas.

Equation of representative section line r:

$$z = ck + d$$

Equation of straight line extending from side of box:

$$y = ax + b$$

$$\text{Intersection point} = \left[ -\frac{b-d}{a-c} a * \left( -\frac{b-d}{a-c} + b \right) \right]$$

When the ground truth may be generated in step S210 of FIG. 5, the low-level information extraction unit 210 extracts low-level information for each section based on the ground truth (S220). The low-level information may be extracted through a nearest-neighbor scheme. That is, among a plurality of pieces of low-level information for each section, which may be present near the ground truth, the nearest information may be extracted as target low-level information.

Figure 9A:
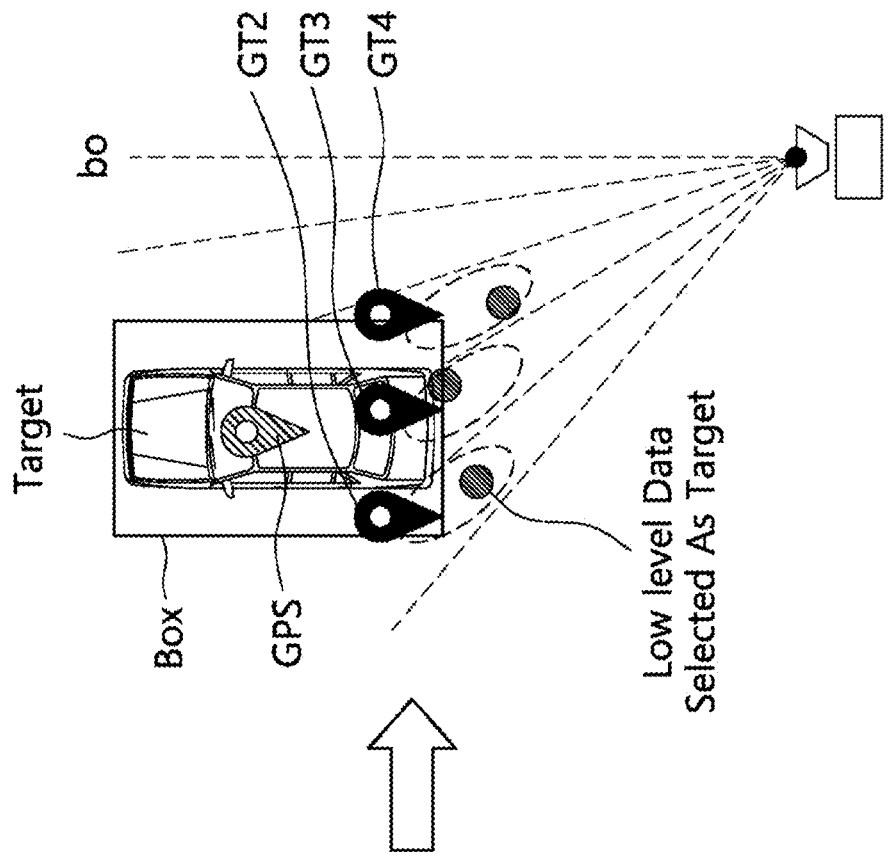
Figure 9B:
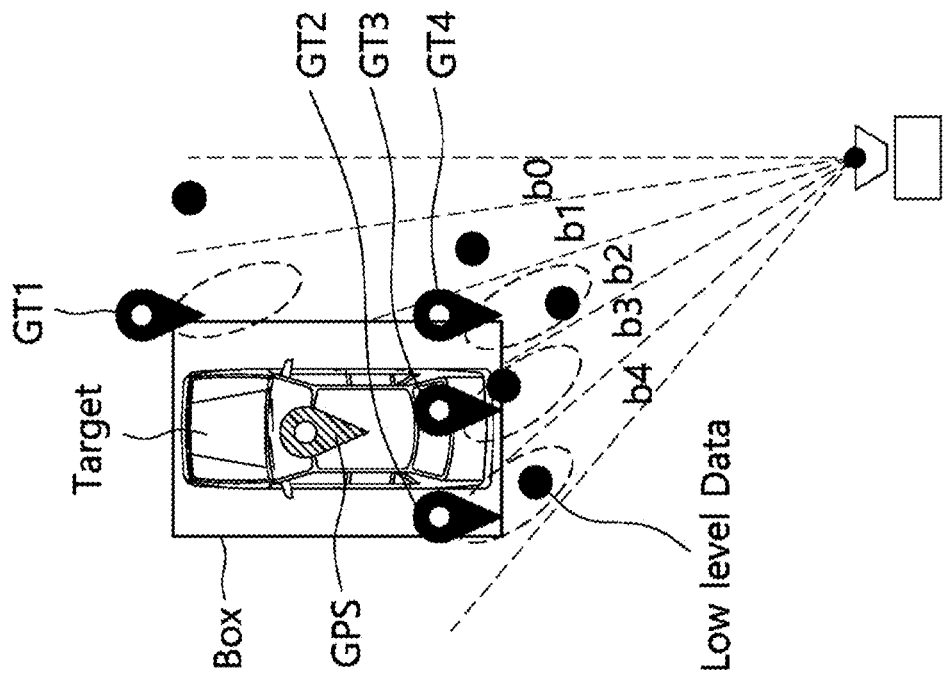

FIGS. 9A-9B are diagrams for explaining a method of extracting target low-level information through a nearest-neighbor scheme. Referring to FIG. 9A, no low-level information may be present within a predetermined region adjacent to a first ground truth GT1 in a beam section b1 in which the first ground truth GT1 may be generated. Accordingly, no target low-level information may be extracted from the beam section b 1. As shown in FIG. 9B, each of low-level information present within a predetermined region adjacent to a second ground truth GT2 in the beam section b2, low-level information present within a predetermined region adjacent to a third ground truth GT3 in the beam section b3, and low-level information present within a predetermined region adjacent to a fourth ground truth GT4 in the beam section b4 may be extracted as target low-level information.

Figure 10:
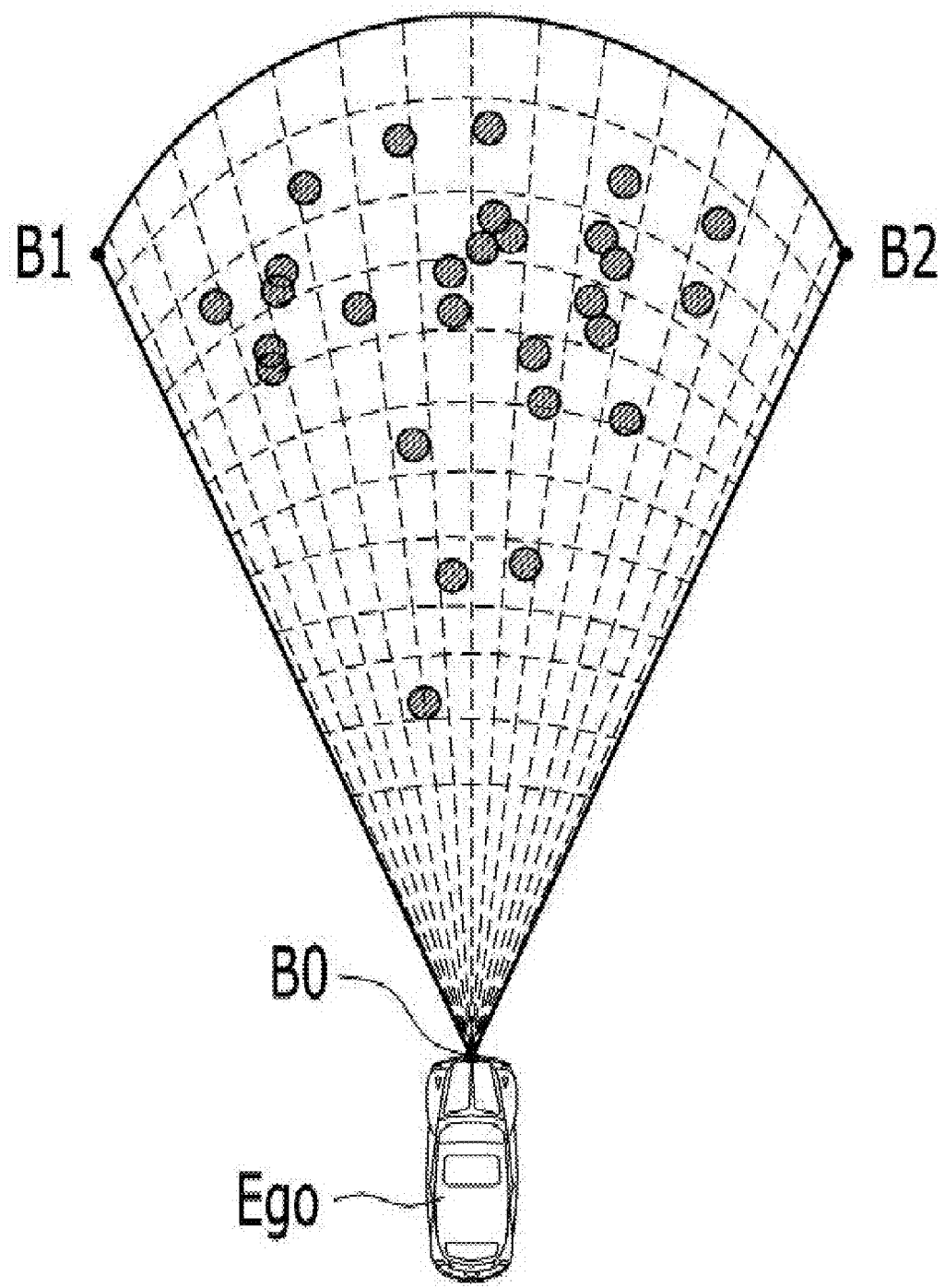

After the low-level information for each section may be extracted based on the ground truth in step S220 of FIG. 5, the information classification unit 220 classifies the extracted target low-level information based on a polar grid cell (S230). Since section information may be distinguished by a direction θ, the low-level information may be expressed using a polar coordinate system, which indicates a distance and a direction. Accordingly, it may be possible to classify information for each sensor regardless of the size of the beam section using a polar grid cell. The size of the polar grid cell may vary depending on the resolution of the sensor section. Referring to FIG. 10, sensor data may be acquired from the target vehicle Target at all possible locations in the section estimated to be the FOV of the sensor of the host vehicle Ego (the fan-shaped section B1B0B2), and thus a ground truth may be generated at each location. Accordingly, target low-level information may be acquired. As shown in FIG. 10, the target low-level information acquired at each location may be expressed on the polar grid cell.

After the pieces of target low-level information may be accumulated based on the polar grid cell in step S230 of FIG. 5, the means and variances of errors of the locations and speeds may be calculated (S240).

Figure 11:
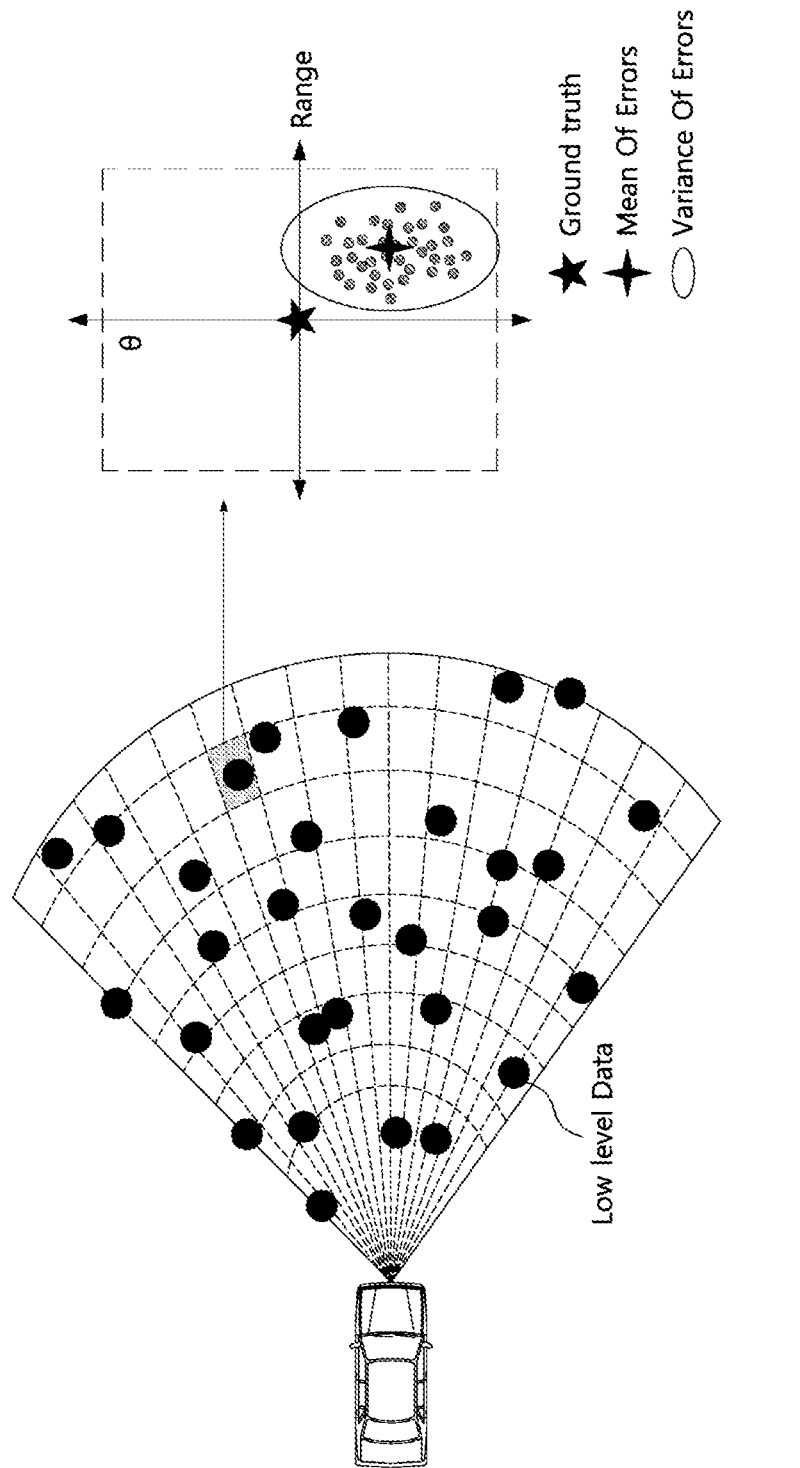

Referring to FIG. 11, the ground truth may be generated in each polar grid cell. Errors of the locations and the speeds of the pieces of target low-level information extracted in the corresponding cell relative to the ground truth may be calculated.

The means and the variances of the errors may be calculated using the following equations.

$$\text{mean}(x) = \frac{1}{n}\sum_{i=1}^{n} x_i \quad \text{Var}(x) = \frac{1}{n}\sum_{i=1}^{n}(x_i - \text{mean}(x))^2$$

$x_i$: measurement error
mean(x): mean of error
Var(x): variance of error

After the means and the variances of the errors may be calculated in step S240 of FIG. 5, the coordinate system transformation unit 240 transforms the polar coordinate system into a normal coordinate system (an ISO coordinate system) (S250). The ISO coordinate system may be a Cartesian coordinate system. Because the size of the polar grid cell varies depending on the resolution of a sensor, the polar coordinate system may be transformed into an ISO coordinate system in order to analyze the performance of each sensor, and accordingly, it may be possible to compare the performance of the sensors. Accordingly, the error and reliability of the grid cell may be estimated by accumulating a plurality of pieces of polar grid cell information based on an ISO grid cell having a given size.

The polar coordinate system may be transformed into a normal coordinate system (an ISO coordinate system) using the following equation.

$$[r,\theta] \rightarrow [r\cos\theta, r\sin\theta]$$

Here, "r" represents the distance from the origin, and "θ" represents the angle between the x-axis and "r".

After transformation into the ISO coordinate system in step S250 of FIG. 5, an actual FOV may be estimated by accumulating the pieces of target low-level information (S270). The pieces of target low-level information may be pieces of information acquired while the target vehicle moves in the entire section estimated to be the FOV. Accordingly, an actual FOV may be estimated based on the boundary at which the pieces of target low-level information may be acquired.

Figure 12:
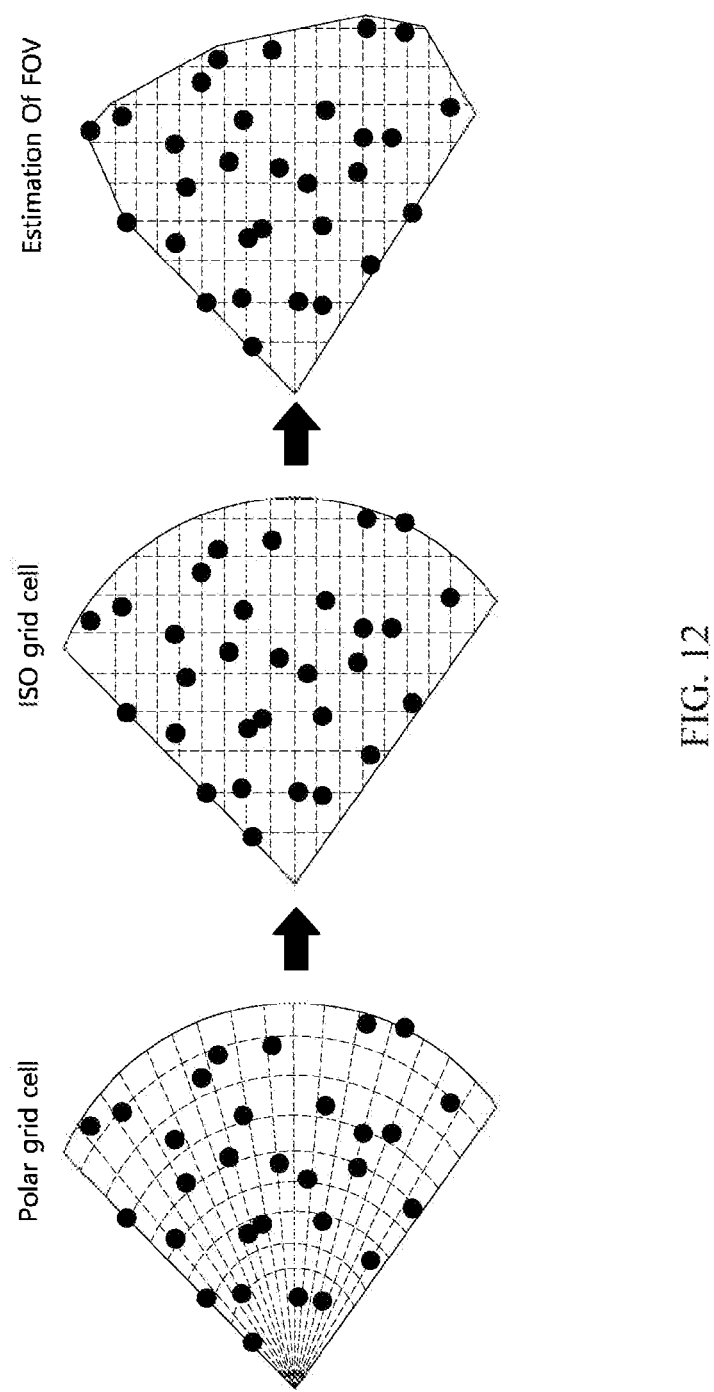

Referring to FIG. 12, the pieces of target low-level information may be accumulated based on the polar grid cell, the polar grid cell containing the pieces of target low-level information may be transformed into the grid cell of the ISO coordinate system, and the maximum range within which the pieces of target low-level information may be acquired may be analyzed. In this way, the actual FOV of the sensor may be estimated.

The actual FOV and the error and reliability of the grid cell, which may be generated by the sensor performance map generation unit 200 through the above-described process, may be stored in the memory 300 in the form of a sensor performance map for each sensor (S270).

Figure 13:
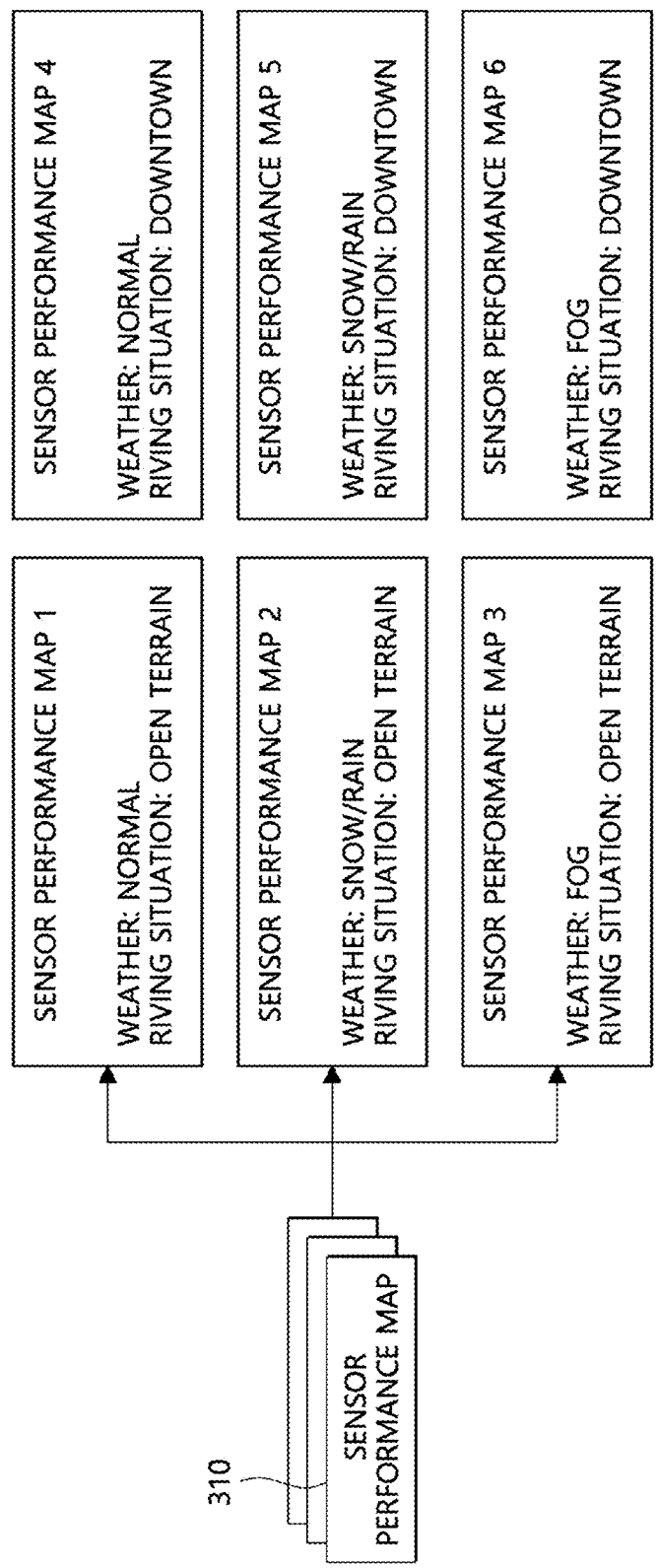
FIG. 13 is a diagram illustrating the configuration of a sensor performance map stored in a memory of the sensor information processing apparatus according to an embodiment.

FIG. 13 is a diagram illustrating the configuration of the sensor performance map stored in the memory 300.

The performance of the sensor may vary depending on the driving environment, for example, weather conditions, such as snow, rain, fog, and temperature, and the type of road, such as an expressway, a city road, and an unpaved road. Accordingly, the accuracy and reliability of each sensor may be evaluated in each driving environment. As shown in FIG. 13, a plurality of performance maps may be set for each sensor according to weather and driving conditions.

Figure 14:
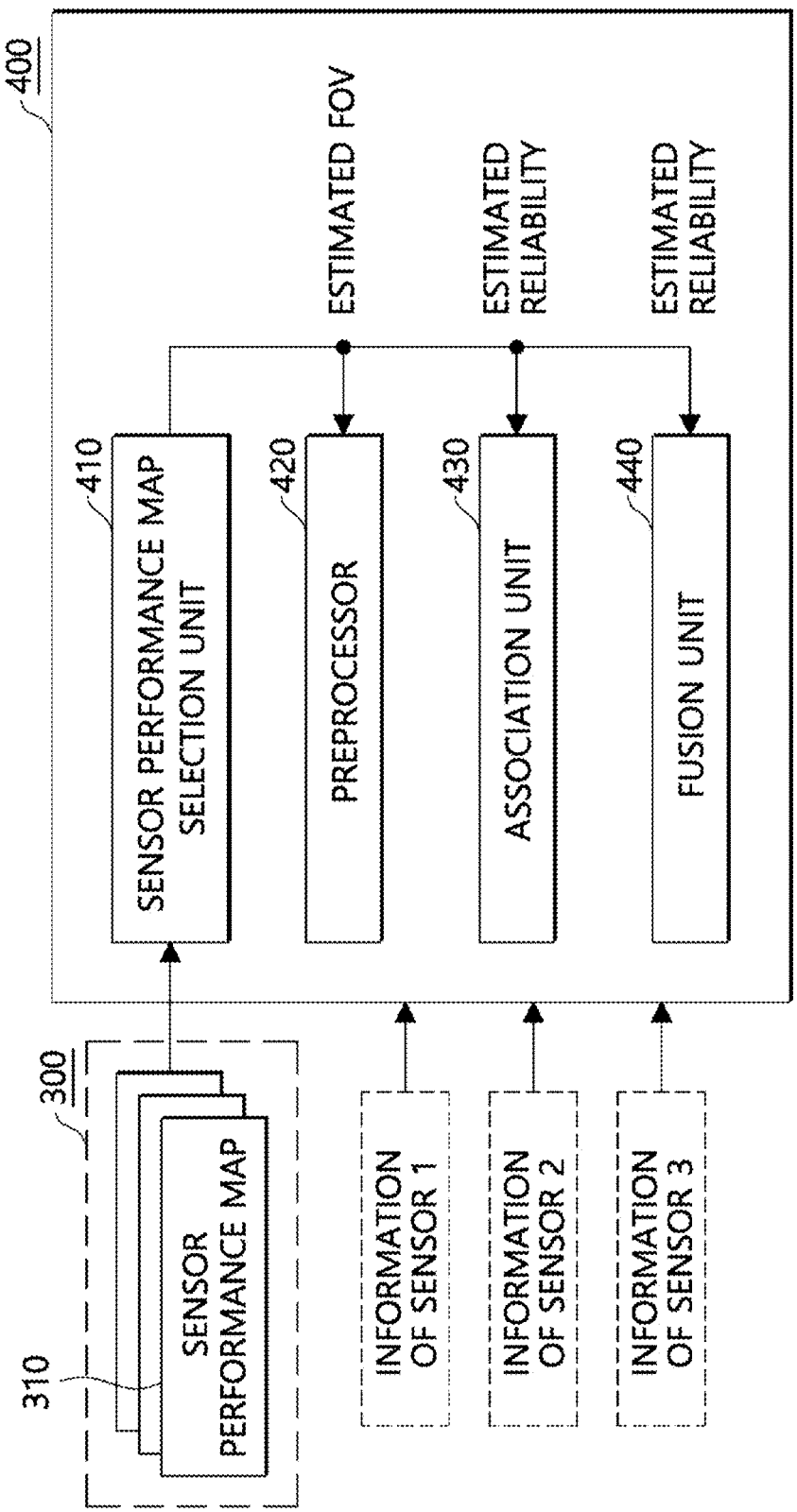
FIG. 14 is a block diagram schematically illustrating the configuration of a sensor fusion unit of the sensor information processing apparatus according to an embodiment.

FIG. 14 is a block diagram schematically illustrating the configuration of the sensor fusion unit 400 of the sensor information fusion device according to an embodiment. The sensor fusion unit 400 may process the low-level information, having the form of detection points acquired by the plurality of sensors 1 to n, based on the sensor performance map 310 stored in the memory 300.

Referring to FIG. 14, the sensor fusion unit 400 may include a sensor performance map selection unit 410, a preprocessor 420, an association unit 430, and a fusion unit 440.

The sensor performance map selection unit 410 may select the sensor performance map 310 according to the driving environment, for example, weather conditions, such as snow, rain, fog, and temperature, and the type of road, such as an expressway, a city road, and an unpaved road.

The preprocessor 420 removes erroneously detected information from the pieces of low-level information according to the estimated FOV stored in the sensor performance map 310. The preprocessor 420 may determine low-level information acquired at a location outside the estimated FOV stored in the sensor performance map 310 to be erroneously detected information.

The association unit 430 performs an association function on the pieces of low-level information, from which erroneously detected information has been removed, in order to determine whether detected objects may be the same object. A determination may be made as to whether detected objects may be the same object based on the extent of clustering of the pieces of low-level information. If there may be no information on the reliability of the pieces of low-level information, a determination may be made as to whether detected objects may be the same object by calculating the Euclidean distance between the pieces of low-level information. The association unit 430 according to the embodiment may determine whether detected objects may be the same object by calculating the probabilistic distance (Mahalanobis distance) between the pieces of low-level information based on the reliability for each section stored in the sensor performance map 310.

The fusion unit 440 fuses the pieces of low-level information that may be determined to be information on the same object through the sensors, and outputs a sensor fusion result. When fusing the pieces of information of the sensors, the fusion unit 440 may adjust weights for fusion that may be assigned to the sensors based on the information on the reliability of the sensors stored in the sensor performance map 310. For example, a larger weight may be assigned to a sensor having higher reliability, and a smaller weight may be assigned to a sensor having lower reliability, thereby improving the reliability of the finally output sensor fusion result.

Figure 15:
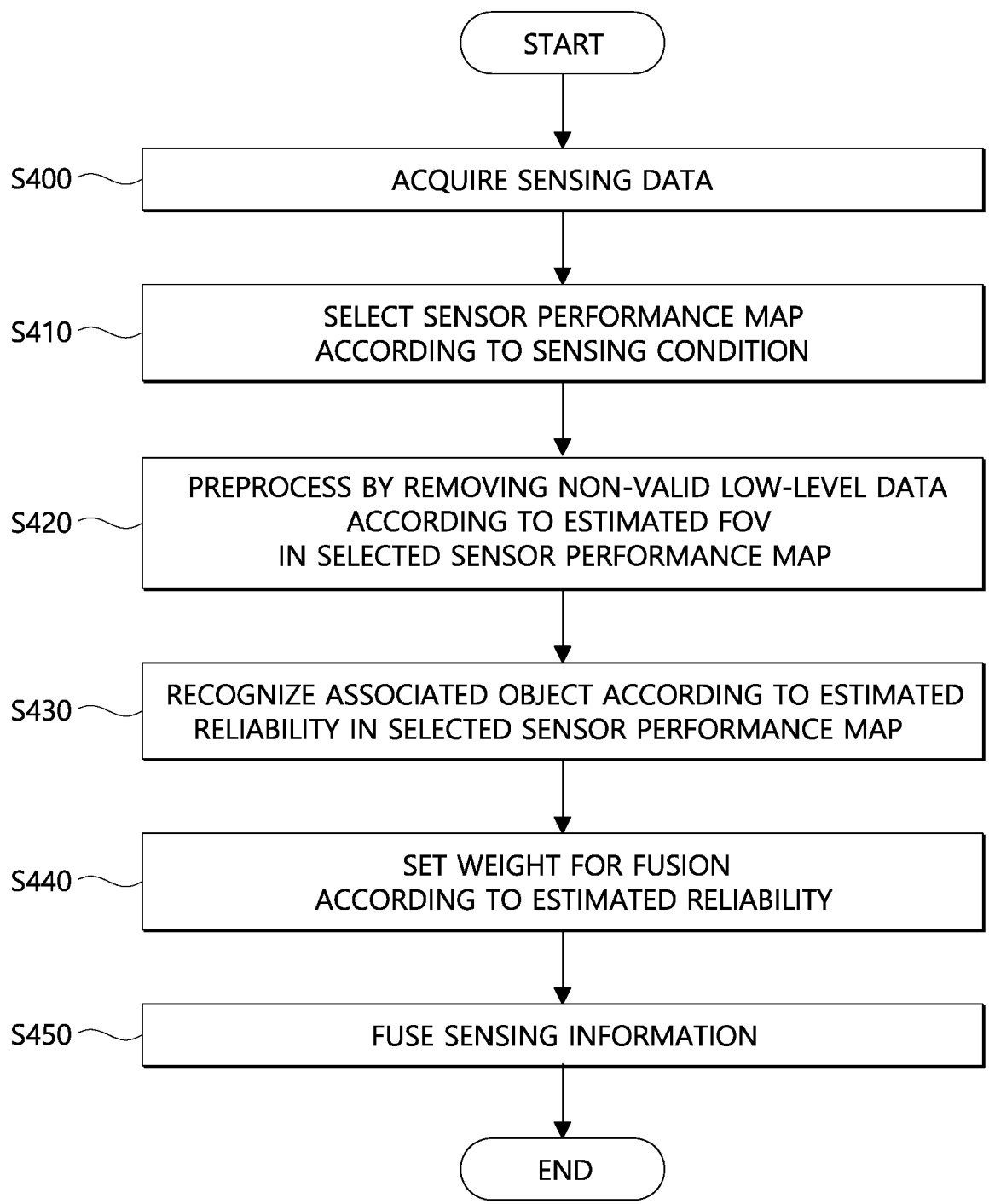
FIG. 15 is a flowchart illustrating a sensor information processing method according to an embodiment.

FIG. 15 is a flowchart illustrating a sensor information fusion method according to an embodiment, which may be performed while the host vehicle may be traveling.

While traveling, the host vehicle acquires sensing data from an object present outside the host vehicle using sensors, such as a camera, a RaDAR, and a LiDAR (S400). The data acquired through each sensor may include low-level information in the form of points.

The sensor performance map 310 may be selected according to a sensing condition (S410). The sensing condition may be variously set according to weather conditions, such as snow, rain, fog, and temperature, and the type of road, such as an expressway, a city road, and an unpaved road.

Erroneously detected information may be removed from the pieces of low-level information according to the estimated FOV stored in the selected sensor performance map 310 (S420). The preprocessor 420 may determine low-level information acquired at a location outside the estimated FOV stored in the sensor performance map 310 to be erroneously detected information, and may remove the erroneously detected information.

An association function for determining whether detected objects may be the same object may be performed according to the reliability information stored in the selected sensor performance map 310 (S430). Since information on reliability may be stored for each section, it may be possible to determine whether detected objects may be the same object using a probabilistic distance (Mahalanobis distance) according to the reliability.

Weights for fusion to be assigned to the sensors may be set based on the information on the reliability of the sensors stored in the sensor performance map 310 in order to fuse information (S440). The pieces of low-level information that may be determined to be information on the same object through the sensors may be fused according to the weights, and a sensor fusion result may be output (S450).

As described above, according to the method and apparatus for processing sensor information and the recording medium storing a program to execute the method of the embodiments, a ground truth for each section may be generated using GPS information and low-level information of an object to be detected, thereby making it possible to evaluate the reliability of the acquired low-level information and to estimate the FOVs of the sensors. In addition, a sensor performance map, in which reliability information, such as the estimated FOV and the mean of errors for each section, may be stored, may be generated for various driving conditions, and may be used when low-level information acquired during travel of the vehicle may be processed, thereby securing the reliability of processing of sensor information and improving the reliability of a sensor fusion result in any of various driving conditions.

As may be apparent from the above description, according to the method and apparatus for processing sensor information and the recording medium storing a program to execute the method of the embodiments, a ground truth for each beam section of a sensor may be generated, and a sensor performance map, in which the estimated actual FOVs of sensors and the evaluated reliability thereof may be stored, may be generated, thereby improving sensor information processing performance.

However, the effects achievable through the embodiments may not be limited to the above-mentioned effects, and other effects not mentioned herein will be clearly understood by those skilled in the art from the above description.

While the present disclosure has been particularly shown and described with reference to exemplary embodiments thereof, these embodiments may be only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of processing sensor information, the method comprising:

detecting a target object by a plurality of sensor beam sections;

generating, based on location information of the target object and low-level sensor information detected from the target object at a corresponding location, a plurality of ground truths comprising a ground truth for each of the plurality of sensor beam sections detecting the target object; and generating, based on the plurality of ground truths, a sensor performance map containing information on accuracy of low-level sensor information detected in the plurality of sensor beam sections;

wherein generating the sensor performance map comprises:

selecting low-level sensor information present within a predetermined distance from a ground truth of a corresponding section, among the sensor beam sections, as target low-level information;

classifying the target low-level information based on a polar grid cell;

calculating error components comprising a location error and a speed error between the target low-level information and the ground truth;

transforming a coordinate system of the target low-level information from a polar coordinate system to a normal coordinate system;

accumulating the error components of a plurality of pieces of polar grid cell based on an ISO grid cell having a given size, and storing accumulated error components for each of the ISO grid cells to generated the sensor performance map.

2. The method according to claim 1, wherein the generating a ground truth of the plurality of ground truths comprises:

estimating, based on the location information, four vertices of a box corresponding to a contour of the target object;

selecting a sensor beam capable of measuring regions between the four vertices; and generating an intersection point between any one of four sides of the box and the sensor beam as a ground truth of a corresponding beam section.

3. The method according to claim 2, wherein the generating the intersection point as a ground truth of a corresponding beam section comprises:

calculating, with a start point of the sensor beam set as an origin point, a first equation of a straight line interconnecting two vertices of a side of the box having the intersection point thereon;

calculating, with an intersection point between a center line of the sensor beam and the side of the box set as a representative point of a corresponding beam section, a second equation of a straight line interconnecting the representative point and the origin point; and calculating an intersection point between a line defined by the first equation of a straight line and a line defined by the second equation of a straight line as the ground truth.

4. The method according to claim 1, wherein the generating a sensor performance map further comprises displaying the target low-level information on a polar grid cell, and wherein the calculating error components comprises calculating at least one of a mean of errors or a variance of errors of the target low-level information displayed on the polar grid cell.

5. The method according to claim 4, wherein the generating a sensor performance map comprises:
estimating, based on the normal coordinate system, a field of view (FOV) in which the target low-level information is acquired; and
storing the FOV to generate the sensor performance map.

6. The method according to claim 1, wherein the generating a sensor performance map comprises generating the sensor performance map taking into account at least one of a weather condition, comprising snow, rain, fog, and temperature, or a type of road, comprising an expressway, a city road, and an unpaved road.

7. The method according to claim 1, further comprising:
sensing a target object moving within a section estimated to be an FOV of a sensor using a plurality of sensors; and
acquiring GPS information of the target object and low-level sensor information detected from the target object in sensor beam sections within which the target object moves.

8. The method according to claim 1, further comprising:
acquiring low-level sensor information detected from a target object located near a vehicle through a plurality of sensors after the generating a sensor performance map; and
fusing sensor information by processing the low-level sensor information based on the sensor performance map.

9. The method according to claim 8, wherein the fusing sensor information comprises removing erroneously detected information from the low-level sensor information based on an FOV stored in the sensor performance map.

10. The method according to claim 8, wherein the fusing sensor information comprises determining whether detected objects are a same object based on the low-level sensor information according to reliability of each of the sensor beam sections set in the sensor performance map.

11. The method according to claim 8, wherein the fusing sensor information comprises variably assigning different weights for fusion to the plurality of sensors according to reliability of each of the plurality of sensors set in the sensor performance map to fuse the low-level sensor information.

12. The method according to claim 8, wherein the fusing sensor information comprises selecting and applying a sensor performance map corresponding to at least one of a weather condition, comprising snow, rain, fog, and temperature, or a type of road, comprising an expressway, a city road, and an unpaved road.

13. A non-transitory computer-readable recording medium in which a program for executing a method of processing sensor information is recorded, the recording medium storing a program to implement:
receiving sensor information from a plurality of sensor beam sections detecting a target object;
a function of generating, based on location information of a target object and low-level sensor information detected from the target object at a corresponding location, a ground truth for each of sensor beam sections detecting the target object; and
a function of generating, based on the ground truth, a sensor performance map containing information on accuracy of low-level sensor information detected in a corresponding sensor beam section;
wherein the function of generating the sensor performance map comprises:
selecting low-level sensor information present within a predetermined distance from a ground truth of a corresponding section, among the sensor beam sections, as target low-level information;
classifying the target low-level information based on a polar grid cell;
calculating error components comprising a location error and a speed error between the target low-level information and the ground truth;
transforming a coordinate system of the target low-level information from a polar coordinate system to a normal coordinate system;
accumulating the error components of a plurality of pieces of polar grid cell based on an ISO grid cell having a given size, and
storing accumulated error components for each of the ISO grid cells to generated the sensor performance map.

14. An apparatus for processing sensor information, the apparatus comprising:
a first controller configured to generate, based on location information of a target object and low-level sensor information detected from the target object at a corresponding location, a ground truth for each of sensor beam sections detecting the target object and to generate, based on the ground truth, a sensor performance map containing information on accuracy of low-level sensor information detected in a corresponding sensor beam section;
a second controller configured to acquire low-level sensor information detected from a target object located near a vehicle through a plurality of sensors after the sensor performance map is built and to fuse sensor information by processing the low-level sensor information based on the sensor performance map; and
a memory configured to store the sensor performance map;
wherein generating the sensor performance map comprises:
selecting low-level sensor information present within a predetermined distance from a ground truth of a corresponding section, among the sensor beam sections, as target low-level information;
classifying the target low-level information based on a polar grid cell;
calculating error components comprising a location error and a speed error between the target low-level information and the ground truth;
transforming a coordinate system of the target low-level information from a polar coordinate system to a normal coordinate system;
accumulating the error components of a plurality of pieces of polar grid cell based on an ISO grid cell having a given size; and
storing accumulated error components for each of the ISO grid cells to generated the sensor performance map.

15. The apparatus according to claim 14, wherein the first controller is configured to estimate, based on the location information, four vertices of a box corresponding to a contour of the target object, select a sensor beam capable of measuring regions between the four vertices, and generate an intersection point between any one of four sides of the box and the sensor beam as a ground truth of a corresponding beam section.

16. The apparatus according to claim 15, wherein the first controller is further configured to generate the sensor performance map by estimating a field of view (FOV) in which the target low-level information is acquired, and storing the estimated FOV in the sensor performance map.

17. The apparatus according to claim 15, wherein the first controller is configured to generate the sensor performance map taking into account at least one of a weather condition, comprising snow, rain, fog, and temperature, or a type of road, comprising an expressway, a city road, and an unpaved road.

18. The apparatus according to claim 14, wherein the second controller is configured to fuse the sensor information by removing erroneously detected information from the low-level sensor information based on an FOV stored in the sensor performance map, determining whether detected objects are a same object based on the low-level sensor information according to accuracy of the low-level sensor information detected in the sensor beam sections, and variably assigning different weights for fusion to the plurality of sensors according to reliability of each of the plurality of sensors set in the sensor performance map.

* * * * *